Sept. 15, 1953   G. L. OSWALT   2,652,142
ENDLESS CHAIN AND MEANS OF MAKING SAME
Filed April 4, 1950
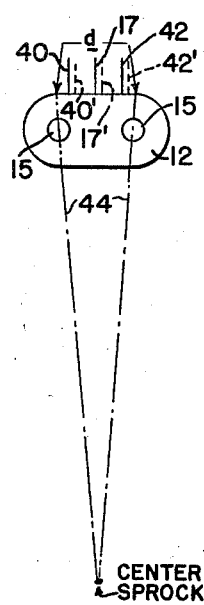
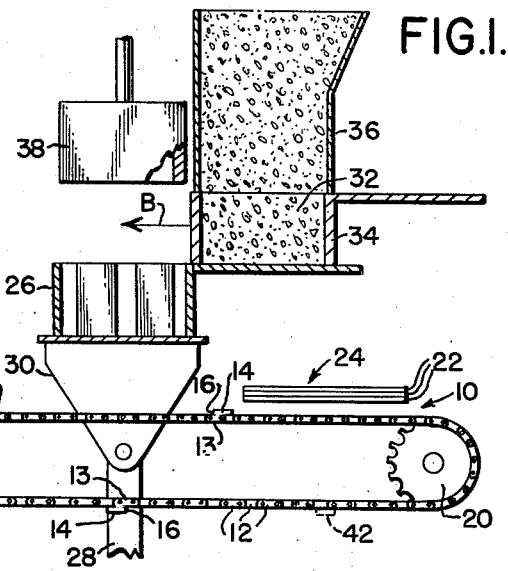
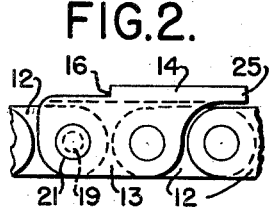
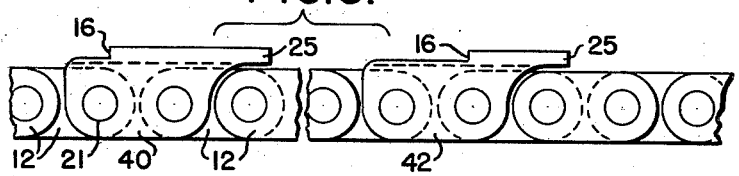
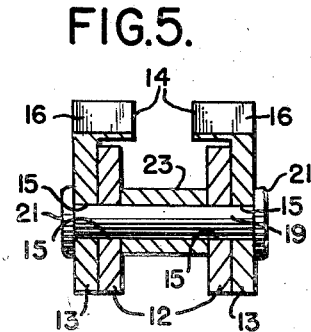
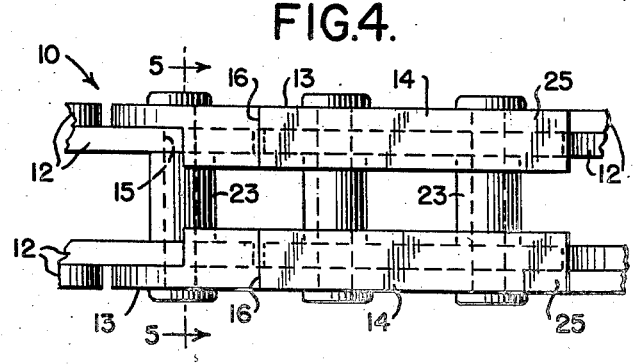
INVENTOR.
GEORGE L. OSWALT
ATTORNEYS Patented Sept. 15, 1953

2,652,142

UNITED STATES PATENT OFFICE 2,652,142

ENDLESS CHAIN AND MEANS OF MAKING SAME

George L. Oswalt, Forest Park, Ill.

Application April 4, 1950, Serial No. 153,890

2 Claims. (Cl. 198—176)

My invention relates, generally, an an endless chain and, more particularly, to that form of chain having some links which have pusher lugs, and to means of making such a chain.

My invention is useful in the formation of any endless chain which is adapted to convey and drive objects by lugs on its links, but it is especially useful in constructing a chain having differently spaced pusher lugs from an existing endless drive chain, particularly when the total number of links in the chain must remain the same. While chains of this type may be employed for conveying or pushing a variety of different objects in association with various types of machinery, it will be illustrated in connection with an automatic block forming machine the chain, or chains, of which are used for conveying or pushing pallets, in sequence, from a stack of pallets to a location where they are used in conjunction with a mold and from there to a discharge point.

In such a block forming machine a single power means may be employed for operating by various shafts, gears, levers and cams, in proper timed sequence, all the mechanism which automatically forms the blocks and discharges them from the machine. In such machine a pair of endless chains in spaced parallel relation and driven by a pair of sprockets on a common shaft have correspondingly disposed pusher lugs on some of their respective links. The corresponding pairs of pusher lugs on the two chains may carry a pallet forward in timed relation toward and beneath a mold just prior to the time when a batch of mix is brought forward for discharge into the mold. The compacting of the mix in the mold and subsequent discharge of the formed block out of the mold and away on the pallet are also in timed sequence. As one pallet carries a formed block, or blocks, away, another pallet is fed forwardly by the chains to the mold in advance of recharging the mold with a new batch of mix. In such arrangement the pusher lugs on the respective chains will be equally spaced apart and the pallet-engaging faces of the lugs will be equally spaced from each other.

Now, if it is desired to speed up the operation of the block making machine to turn out more blocks in a given time, it is necessary to increase the rate of feeding the pallets forwardly to the mold. While, theoretically, the speed of all elements of the machine might be speeded up together at the same rate, including the speed of the endless chains, as a practical matter there are limitations on the speed at which the formed wet blocks can be conveyed on the pallets to the discharge end of the pair of chains without causing damage to the blocks. Consequently, it is more desirable to keep the speed of the endless chains within safe operating speeds and, instead, to use the chains to carry pallets forward more closely spaced together. That necessitates additional links having pusher lugs. However, the addition of the exact number of lugs desired and the spacing of them apart equal distances has been impossible in many instances, since the chain is not always divisible into integers by the number of lugs desired and since the total number of links cannot always be increased or decreased if the chains are to continue to operate in existing machinery.

It is the main object of my invention to provide a process and means for providing an existing link chain (either with its original number of links or with a greater or lesser number of links) with more or less links having pusher lugs with the object-engaging faces of the lugs being spaced exactly equal distances from the adjacent faces even though the chain is not equally divisible by the desired number of lug-bearing links. The way in which this is accomplished will be set forth more fully hereinafter in connection with the accompanying drawings in which:

Figure 1 is a diagrammatic elevational representation of the chain of my invention employed with a block making machine, it being understood that a pair of chains is employed in spaced parallel relation although only one is visible;

Figure 2 is a fragmentary view on enlarged scale of the chain of Figure 1 showing one of the lug-bearing links;

Figure 3 is a fragmentary view of the chain of Figure 1 with two new lug-bearing links inserted in the chain;

Figure 4 is a top plan view on a larger scale of the lug-bearing links illustrated in Figure 2;

Figure 5 is a sectional view on the line 5—5 of Figure 4 looking in the direction of the arrows; and Figure 6 is an elevational view of one link indicating the relative spacing of object-engaging faces for the three lug-bearing links which are to be positioned in the chain of Figure 1.

Referring now to the drawings, it will be seen that an endless chain, indicated generally by the reference numeral 10 and constituting one of a pair of parallel spaced apart chains, is formed of a plurality of links 12 of equal dimensions and generally elliptical shape, certain of which links 13 bear lugs which are indicated generally by the reference numeral 14. Each lug 14 has a pallet-engaging face 16. The pair of chains, such as chain 10, is mounted on pairs of spaced apart sprockets, such as sprockets 18 and 20, of equal diameter which are driven from a source of power (not shown) in order to drive the chains in the direction of the arrow A of Figure 1.

Solely for purposes of illustration, the endless chains are shown for use in conjunction with feeding forward by means of their lug-bearing links 13 a series of pallets, each of which is indicated generally by the reference numeral 22. The pallets 22 are arranged in a stack and are fed downwardly to the chains and, when a pair of lug-bearing links comes along, they engage the bottom-most pallet of the stack 24 and convey it in the direction of the arrow A of Figure 1 to a position beneath a mold, which is indicated by the reference numeral 26. An operating arm, or arms, 28 having fingers 30 is adapted then to be raised upwardly from a position beneath the top surface of the chains to lift the pallet from the chains into a position tightly against the bottom of the mold 26. Thereafter, a batch of mix 32 in a carrier, or drawer, 34 is fed forwardly in the direction of the arrow B from beneath a hopper 36 to a position over the mold 26 whereupon the batch 32 descends by gravity into the mold 26. The drawer or carrier 34 is then retracted to a position beneath the hopper 36 and a pressing head 38 descends to compress the mix within the mold 26 to form a block, or blocks. After a period of pressing, during which vibration may be added to assist in compacting the batch into a block, the arm 28 and fingers 30 descend at the same time as the presser head 38 further descends through the mold 26 to discharge the block downwardly from the mold on the pallet 22. When the fingers 30 reach a position beneath the upper surface of the chain 10, the pallet 22 on which the block is positioned is engaged by oncoming lug-bearing links 13 which come forward and push the pallet and block to the discharge end of the endless chains. While that operation is going on, another pair of lug-bearing links is coming along and taking another pallet 22 from the stack 24 and feeding it forwardly to a position beneath the mold 26. In this way, a continuous block forming operation may be carried on.

From Figures 2, 3 and 4 it will be seen that each chain 10 is composed of a plurality of pairs of side by side plain links 12 and lug-bearing links 13, with all of the links (12 and 13) having a pair of pivot-pin bearings 15 by means of which the pairs of side by side links are connected together and to adjacent links by pins 19. The body portion of each lug-bearing link 13 is generally oblong in shape and has an integral flange at one longitudinal edge, which might be called the "outer" edge, with said flange extending substantially at right angles to the body portion and thereby forming the lug 14. Said lug, or flange, also extends longitudinally beyond the body portion of the link 13, as by integral extension 25, so that the flange or lug may overlie longitudinal edge portions of one or more succeeding links 12 which are connected in series in the chain. The heads 21 of the pins 19 are upset to secure them in place and spacers 23 keep the pairs of side by side links in proper relationship and provide bearing surfaces against which the teeth of the sprocket wheels 18 and 20 may engage to drive the chain. Each lug-bearing link 13 has a rearward extension 25 for its flange or lug 14 which extension helps to keep the lug maintained in proper horizontal position when it is in engagement with a pallet. The "end" edge, or "rear" edge, of the body portion of the link 13 extends longitudinally into connection with extension 25 with said extending portion having a curved outline complementary to the adjacent edge of a succeeding link 12 in the series of links.

While the chains 10 of Figure 1 each have two pairs of side by side lug-bearing links 13, let us assume that it is desired to speed up the operation of the block making machine without speeding up the speed of the chain or changing its length. It then becomes necessary, in order to have pallets 22 supplied to the bottom of the mold 26 in proper timed sequence, to provide each chain with additional lug-bearing links 13. (While pairs of side by side lug-bearing links are preferable in each chain, one such link, paired with a plain link, will work.) Let us further assume that chain 10 of Figure 1 contains 100 links, the two pairs of lug-bearing links 13 having their respective pairs of pallet-engaging faces 16 spaced apart a distance corresponding to 50 links. Since the length of the chain 10 in the block forming machinery either cannot be changed, or can be changed only with extensive and expensive changes in the entire machinery, and since it is not desirable to speed up the operation of the chain for fear of damage to the blocks which are carried on the pallets, it then becomes necessary to find some way to incorporate additional lug-bearing links in the chain. Assume that the chain's speed of operations necessitates three pairs of lug-bearing links in place of the two lug-bearing links 13 shown in Figure 1. The spaced relation of such pairs of lug-bearing links is indicated by the uppermost lug-bearing link 13 of the chain and by the two links 40 and 42 having lugs indicated in dotted outline. However, since 100 links which go to make up the chain are not divisible equally by three, a problem is immediately raised as to how to feed the pallets forward in proper spaced relationship at the proper time. The same problem would be presented if the chain of 100 links were to have a total of six, seven, eight, nine, eleven, thirteen, etc., lug-bearing links, since 100 is not equally divisible by any of those numbers.

In order to provide the chain with additional lug-bearing links (or where it is necessary or desirable for some reason to provide a lesser number of lug-bearing links in a chain), I first divide the total number of links, which we can call N links, by the total number of lug-bearing links which are desired, said number being called $n'$, to obtain an approximation of the number of links apart which the lug-bearing links will be positioned. An integer plus a fraction will be the quotient. I then form a series of $n'$ links, the object-engaging faces of which are disposed at different locations longitudinally of their respective links, with the increment of variation in locations in the series being $1/n'$ times the distance which lies along the outer edge of a link between a pair of radii of the driving sprocket for the chain, with the radii being drawn through the centers of the two pivot-pin bearings of the link. Such series of links can, in some cases, include one of the existing lug-bearing links 13. Then, I insert in the chain, in place of some of the existing plain links 12 or the original lug-bearing links 13 (the latter being designated as the $n$ links) at approximately $N/n'$ links apart, the links of the series of $n'$ links, whereupon the object-engaging faces of the successive $n'$ links are spaced equally apart from each other, although the centers of the $n'$ links are spaced apart only approximately equally. Then I substitute plain links for any of the $n$ original lug-bearing links 13 which are not used in the series of $n'$ links.

Taking the chain 10 of Figure 1 by way of example, let N equal 100 links, $n$ equal 2 lug-bearing links 13, and $n'$ equal 3 lug-bearing links which may, but do not necessarily have to, include one of the lug-bearing links 13. $N/n'$ equals $33\frac{1}{3}$ links. Since fractions of links cannot be employed in the endless drive chain 10, I form the series of $n'$ links with their pallet-engaging faces disposed at different locations along their respective links. The increment of variation between positions of the lug-engaging faces of the three links is equivalent to $1/n'$ times the distance $d$ indicated in Figure 6 of the drawings. That distance is measured along the outer edge of a link 12 between two radii 44 which extend from the center of the driving sprocket 18 through the centers of the pivot-pin bearings 15 which lie adjacent opposite ends of the link 12. Where, for example, a lug-bearing link such as one of the links 13 of Figures 1 and 2 is already available and usable, it can be retained in the link chain and the other lug-bearing link 13 can be removed and have a plain link substituted in its place. Then, by substituting for a pair of the plain links in chain 10 at 33 and 34 links apart from each other the lug-bearing links 40 and 42, an exactly equal spacing of the object-engaging faces 16 may be provided, even though the centers of the lug-bearing links are only approximately equally spaced apart from their adjacent lug-bearing links. In Figure 6 the relative positions of the three pallet-engaging faces of the lugs of links 40, 13 and 42 are indicated by vertical lines carrying those respective reference numerals.

While it is convenient, in this particular example, to employ one of the original ($n$) lug-bearing links 13, it is not necessary to do so, so long as the faces of the three lug-bearing links are so disposed along their respective links at various locations corresponding to $1/n'$ times the distance $d$. An example of other locations of the object-engaging faces is indicated by the vertical dotted lines indicated by the reference numerals 40', 17' and 42'.

It will be readily appreciated that, if more lug-bearing links than three are to be employed, the distance corresponding to $1/n'$ times $d$ will be smaller. That is to say, the increment of variation in positions of the series of faces 16 of the $n'$ links will be smaller and will generally lie to one side or the other of a transversely extending plane which intersects the links at its midpoint. If one of the lug-bearing links, such as link 13 in the series of three lug-bearing links, has the object-engaging face disposed midway between the ends of the link, then the object-engaging faces on the other links of the series will be spaced therefrom multiples of $1/n'$ times $d$. Where none of the lug-bearing links of the series of $n'$ links have their object-engaging faces disposed midway between the ends of the link, the object-engaging faces will lie to either side of the center of the link an amount corresponding to a distance greater than zero and less than $1/n$ times $d$, or the foregoing amount plus a multiple of $1/n'$ times $d$.

From the foregoing it will be seen that by my invention an existing chain having N links with $n$ lug-bearing links, wherein $N/n$ equals an integer, can be changed to a chain having the same number of links, N, with the object-engaging faces 16 of the lug-bearing links being exactly equally spaced from the adjacent faces, even though the number of lug-bearing links is increased to $n'$ and $N/n'$ is not an integer.

It will also be appreciated that my invention is equally usable where a chain having N links is to be lengthened, or shortened, so that it has N' links with either the original number of lug-bearing links $n$ or a new number of lug-bearing links $n'$, and wherein $N'/n$ or $N'/n'$ is not an integer.

While my invention has been illustrated in connection with an automatic block making machine, it will be appreciated that the invention is usable wherever an endless drive chain having lug-bearing links is employed for conveying or pushing various objects. Although I have illustrated a preferred form of the invention, I do not intend to be limited thereto, except insofar as the following claims are to limited, since various changes which do not depart from the scope of the invention will occur to those skilled in the art in view of my disclosure.

I claim:

1. An endless link chain having a plurality of generally elliptical links with each link having a pivot pin bearing adjacent its opposite ends, lug-bearing links in series with said first-mentioned links, each lug-bearing link having a body portion of generally oblong shape and having pivot pin bearings adjacent opposite ends of the link, an integral flange at one longitudinal edge of the body portion extending substantially at right angles to said body portion to constitute a lug, with said lug also extending longitudinally beyond said body portion whereby the lug may closely overlie longitudinal edge portions of at least one succeeding link, the end edge of said body portion, adjacent said longitudinal extension of said lug, itself extending longitudinally into connection with said lug by a portion having an outline complementary to the adjacent edge of a succeeding link, and an object engaging face on said lug, said face being disposed closely above said longitudinal edge of said link and to either side of a transverse plane which intersects the link midway between the pivot bearings.

2. A link for an endless chain having a series of connected links, said link comprising a body portion of generally oblong shape having pivot pin bearings adjacent opposite ends of the link, an integral flange at one longitudinal edge of the body portion extending substantially at right angles to said body portion and constituting a lug, said lug also extending longitudinally beyond said body portion whereby it may closely overlie longitudinal edge portions of at least one succeeding link which may be connected in series, and an object engaging face on said integral flange, said face being disposed closely above said longitudinal edge of the link and to either side of a transverse plane which intersects the link midway between the pivot bearings, the end edge of the body portion of the link, adjacent said longitudinal extension of said lug, extending longitudinally into connection with said lug by a portion having an outline complementary to the adjacent edge of a succeeding link.

GEO. L. OSWALT.

References Cited in the file of this patent

UNITED STATES PATENTS

| Number | Name | Date |
|---|---|---|
| 902,524 | Eklund | Oct. 27, 1908 |
| 1,226,156 | Wilson | May 15, 1917 |
| 1,278,543 | Wilson | Sept. 10, 1918 |
| 1,865,879 | Newhouse | July 5, 1932 |